Figure 1:
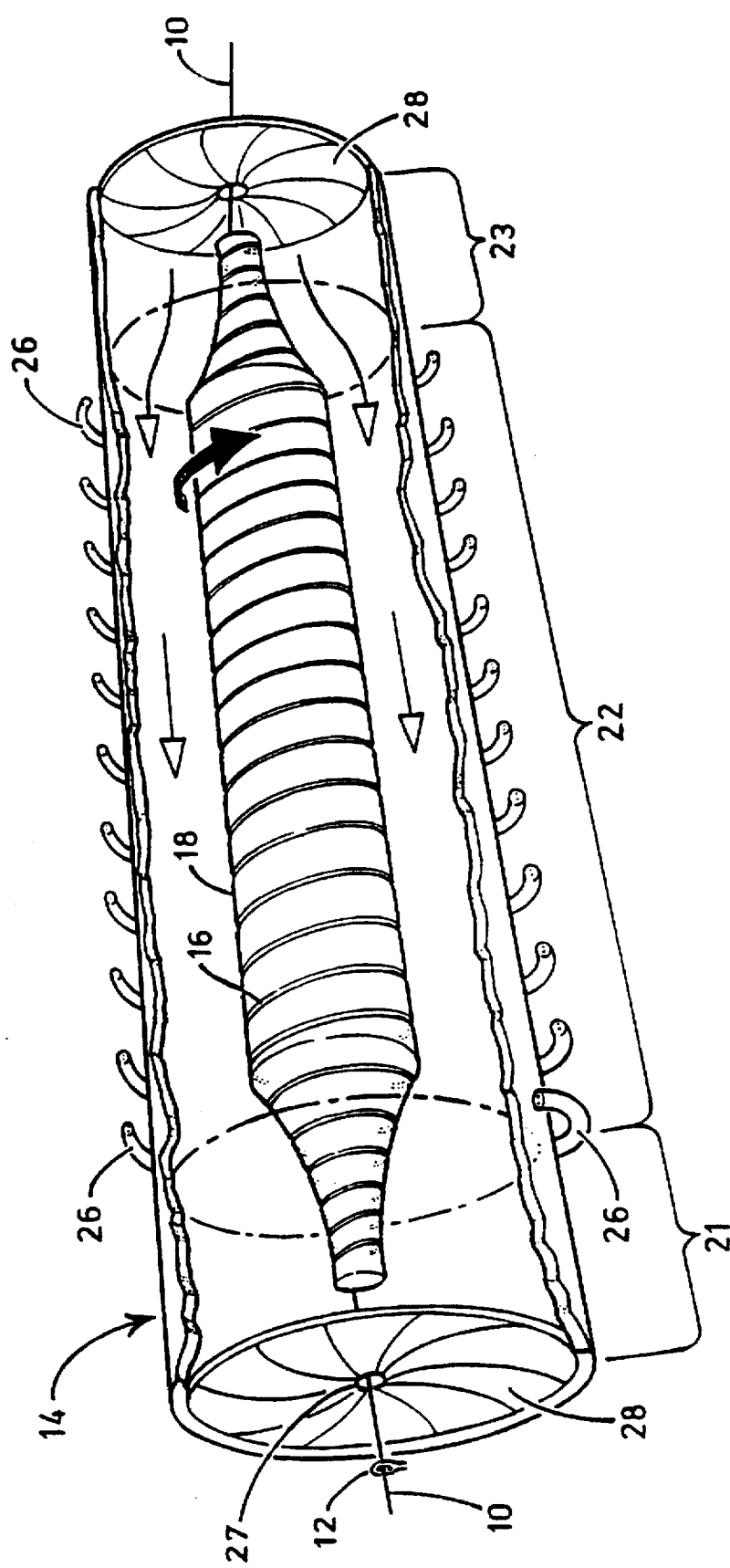

United States Patent [19]
Curran

[11] Patent Number: 5,705,122
[45] Date of Patent: Jan. 6, 1998

[54] A METHOD OF MAKING A COMPOSITE CERAMIC FIBER FROM PRE-CERAMIC POLYMERS

[76] Inventor: Dennis John Gerard Curran, Willows, Horsham Road, Wallis Wood, Dorking, Surrey, RH5 5RL, United Kingdom

[21] Appl. No.: 211,835

[22] PCT Filed: Oct. 30, 1992

[86] PCT No.: PCT/GB92/01993

§ 371 Date: Apr. 29, 1994

§ 102(e) Date: Apr. 29, 1994

[87] PCT Pub. No.: WO93/09278

PCT Pub. Date: May 13, 1993

[30] Foreign Application Priority Data

Oct. 30, 1991 [GB] United Kingdom ............... 9122997

[51] Int. Cl.$^6$ .................................................. C04B 33/32
[52] U.S. Cl. ........................ 264/625; 264/624; 264/626; 264/627; 264/671
[58] Field of Search ............. 264/29.2, 60, 83.82, 264/211.4, 211.5, 211.17, 171.1, 172.14, 172.15, 627, 625, 626, 624

[56] References Cited

U.S. PATENT DOCUMENTS

| 3,795,524 | 3/1974 | Sowman | 106/65 |
| 4,047,965 | 9/1977 | Karst et al. | 160/65 |
| 4,101,615 | 7/1978 | Horikiri et al. | 264/63 |
| 4,698,417 | 10/1987 | Morgan | 528/395 |
| 4,772,524 | 9/1988 | Coblenz | 428/699 |
| 4,797,378 | 1/1989 | Sowman | 501/95 |
| 4,824,623 | 4/1989 | Ramboser | 264/60 |
| 5,017,316 | 5/1991 | Sowman | 264/60 |
| 5,051,215 | 9/1991 | Rabe et al. | 264/29.2 |
| 5,167,881 | 12/1992 | Atwell et al. | 264/22 |
| 5,279,780 | 1/1994 | Lipowitz et al. | 264/82 |
| 5,429,778 | 7/1995 | Patel et al. | 264/29.2 |
| 5,547,623 | 8/1996 | Barnard | 264/82 |

FOREIGN PATENT DOCUMENTS

| A-0 435 065 | 7/1991 | European Pat. Off. |
| A-4 110 917 | 10/1992 | Germany. |
| WO-A-9 116 479 | 10/1991 | WIPO. |

OTHER PUBLICATIONS

Database WPIL, Week 8833, Derwent Publications Ltd, London, GB; AN 88-231693 & JP-A-63 65 436; 8 Jul. 1988.

*Primary Examiner*—Christopher A. Fiorilla
*Attorney, Agent, or Firm*—Bacon & Thomas

[57] ABSTRACT

The invention pertains to a composite ceramic fibre which is made from a self-supporting composite polymeric fibre by the conjugate spinning of at least two dissimilar pre-ceramic polymers in shapes varying from cylindrical to ribbon-like, and pyrolysing the spun fibre to form a composite bilateral, core sheath or matrix-fibril ceramic fibre having regions with ceramic compositions derived from each of the polymers, enabling physical and chemical characteristics to be widely varied for use as matrix reinforcements and other applications. A pyrolysis furnace includes countercurrent controlled atmosphere gas flow for chemically stabilizing or modifying the fibres.

46 Claims, 2 Drawing Sheets

A METHOD OF MAKING A COMPOSITE CERAMIC FIBER FROM PRE-CERAMIC POLYMERS

This invention relates to ceramic fibres. It is concerned with methods of making such fibres, and with the fibres so made, and with their uses.

Ceramic compositions typically include oxides, carbides and nitrides of metals and non-metals, and extend more generally to simple binary or more complex solid inorganic compounds, excluding salts. Ceramics tend to result from high temperature processing which consolidates the material. Fibres containing ceramic compounds are referred to herein as ceramic fibres. Compounds which yield ceramics after pyrolysis, or firing, are referred to as ceramic precursors, or pre-ceramic materials. Fibres containing ceramic precursors, which after firing will form ceramic fibres, are referred to as pre-ceramic fibres.

This invention is especially concerned with composite or multicomponent ceramic materials that include compounds between metals and non-metals; although ceramics including compounds wholly between non-metals, such as silicon carbide and boron nitride, are also made available by the invention. Glasses may be included among the ceramics, and the invention is applicable to non-glass ceramics and glassy ceramics as distinct classes of product.

References to fibres are intended also to include filaments, ie long or continuous fibres. The fibres are generally manufactured as filaments. Short fibres can be made from the filaments by chopping or other processes.

A particularly important use of ceramic fibres is as reinforcements for glass, metal and ceramic products, to prevent catastrophic failure of the products under stress. A serious problem can be that the fibre that in itself has good properties from a mechanical point of view may not be chemically or physically compatible with the matrix into which it is to be incorporated as a reinforcement. Ceramic materials also have many other uses, and show a very wide range of electrical properties, from insulators through semiconductors to superconductors.

Known methods of making ceramic fibres include chemical vapour deposition and pyrolysis of a given polymer. The former is slow and expensive, and tends to give stoichiometric, monolithic, inflexible fibres of large diameter. The latter gives monolithic nonstoichiometric fibres which are more flexible. Both give fibres that can be reactive with the matrix unless they are reprocessed to coat them.

My International Patent Application PCT/GB91/00604, Publication No WO 91/16479, discloses methods of making a range of ceramic materials which can be tailored and selected for a wide range of purposes, and the disclosure of that publication is incorporated herein by reference, especially as concerns spinning and pyrolysis techniques. The method that is described in detail is to pyrolysis a dispersion of an organo-metallic ceramic precursor in a carrier comprising an organic polymer, The use of the carrier polymer enables many organo-metallic ceramic precursors to be used that otherwise could not be used, because of handling difficulties, and the use of at least two components also permits wide variation and control of the chemistry of the feedstock for pyrolysis. The dispersion of organo-metallic ceramic precursor in the polymer can also allow mixing of the distinct starting materials down to a molecular level, much more intimately than is possible by mixing separate powders, and this can give a more homogeneous product.

In applying that invention to the preparation of ceramic fibres, that application refers in broad terms to a method comprising spinning a plurality of polymeric materials each comprising at least one ceramic precursor into a composite fibre, and thereafter pyrolysing the composite fibre to form a composite or multicomponent ceramic fibre of non-homogeneous composition. All the examples given describe the use of at least one organic polymer, which is not in itself a ceramic precursor, carrying a dispersion of the organo-metallic ceramic precursor.

I have now discovered that the conjugate spinning techniques described in my earlier application for the preparation of composite ceramic fibres can be utilised without the need for a separate organic polymer carrier and organo-metallic ceramic precursor in either of the components of the conjugate spun fibre, and that it is possible to achieve many of the benefits of my earlier invention by the pyrolysis of self-supporting fibres of polymer ceramic precursors.

According to the present invention a method of making a composite ceramic fibre comprises forming a self-supporting composite polymeric fibre by the conjugate spinning of at least two dissimilar pre-ceramic polymers, wherein each of said polymers includes repeating units containing a ceramic-forming element other than carbon and oxygen, and thereafter pyrolysing the spun fibre to form a composite ceramic fibre having regions with dissimilar ceramic compositions derived from the respective dissimilar polymers.

If there are more than two pre-ceramic polymers in the composite fibre formed by conjugate spinning, a corresponding number of regions with dissimilar ceramic compositions may be formed by pyrolysis of the fibre.

In order to form the composite or multicomponent ceramic fibres, the conjugate spinning may be carried out by known methods that form composite bilateral, core-sheath or matrix-fibril fibre structures, for example. Suitable methods of fibre spinning may include wet spinning, dry spinning, melt spinning, dispersion or emulsion spinning, and reaction spinning. These techniques are all well known in themselves. The selection will be dependent upon the natures and reactivities of each polymeric ceramic precursor.

The composite fibres are not limited to fibres with only two regions, as a core and a sheath. More complex and multi-layer systems are envisaged. For example, a sheath may contain multiple cores. Further, an intermediate sheath may separate an incompatible core and outer sheath. The incompatibility might be chemical or physical. A carbon inner sheath derived from a simple organic polymer might be used as a chemical buffer between core and outer sheath, or as a region of intermediate expansion between a core which has a low coefficient of expansion and a high expansion outer sheath.

To maintain the desired composite fibre structure during and after spinning, the different pre-ceramic polymers may with advantage be immiscible. The fibres may be shaped by selecting an appropriately shaped spinneret orifice. The fibre shapes may vary widely, from cylindrical to ribbon-like, and include hollow fibres.

In order to give significant yields of each ceramic composition, the proportion of each pre-ceramic polymer may be at least 5% by weight of the whole fibre before pyrolysis.

As a general example, a first polymeric ceramic precursor can be co-extruded around a central core of a second polymeric ceramic precursor. The second polymer may be from 5 to 85% of the whole, by weight, at the point of extrusion.

The ceramic fibres of the invention have various uses, including the reinforcement of metals, of ceramic matrix composites, and of plastics, and as electrical conductors with various properties. The conjugate spinning technique permits the production of internally structured ceramic fibres that have variable compositions over their cross sections, which thereby offer outstanding advantages. Fibres of a specific internal composition for principal physical properties may be given a different surface by selecting the appropriate core/sheath materials before pyrolysis. Sophisticated surface barrier layers can be designed. Fibres destined for use as matrix reinforcements can be provided with enhanced matrix compatibility to resist pull-out, delamination and other problems.

The compositions of the pre-ceramic polymers may vary widely. In general organometallic and Inorganic fibre-forming polymers may be used, being suitable polymeric compounds of ceramic-forming elements.

Preferably at least one of the pre-ceramic polymers is a pre-ceramic organic polymer, ie one having carbon in its repeating unit, and optionally all the pre-ceramic polymers making up the conjugate spun fibre are organic. Preferably at least one contains metal atoms in its repeating groups, and optionally all do. The metal or metals may suitably be selected from the transition metals; or may in particular be one or more selected from titanium, vanadium, chromium, manganese, iron, cobalt, nickel, aluminium, gallium, yttrium, zirconium, niobium, molybdenum, ruthenium, rhodium, palladium, lanthanum, hafnium, tantalum, tungsten, rhenium, osmium, iridium, platinum and the lanthanoids.

The following non-metals and metalloids in particular may be present in the polymeric precursor to form the ceramic compound: carbon, boron, silicon, nitrogen, oxygen, phosphorus, sulfur, germanium, and arsenic. In ceramic precursors without metals, silicon and boron are preferred constituents.

Pyrolysis gives simple and complex carbides, nitrides, borides, silicides, and finally oxides. While the products are usually non-stoichiometric, the inclusion of other refractory, ceramic, pre-ceramic and/or metal additives in the polymer can improve stoichiometry.

Certain oxide type ceramics are known to show superconducting properties at low temperatures. These tend to include elements such as barium, bismuth, strontium, calcium, copper and oxygen, together with lanthanum or other lanthanoids such as yttrium, europium, gadolinium, holmium, erbium and others. Some pre-ceramic compounds of these elements will not be capable of forming polymeric species suitable for fibre forming, but nevertheless such an element can be incorporated into the fibre by dispersing it, in a convenient form, within a pre-ceramic polymer that includes others of the elements required. As is described later below, the desired stoichiometry in the ceramic product can be manipulated by careful selection of starting polymer composition, the use of additives such as powdered metals or ceramics in controlled proportions, and additions to the pyrolysis atmosphere. Thus to include barium, for example, a dispersion of barium oxide or mixed barium-copper oxide can be used.

In composite ceramic fibres where one of the ceramic regions is a glass, the glass usually contains elements selected from aluminium, silicon, boron, phosphorus, calcium and sodium. Various aluminosilicates are typical examples. Other elements may be present, such as lithium, sodium and potassium, and transition metals, including lanthanoids, to give the requisite properties, such as strength, high temperature capability, compatibility with a matrix, colour, and so on.

Glassy ceramics can result from the pyrolysis of a variety of pre-ceramic polymers, as is known in the art. One class is alkoxide polymers, including single, double and tertiary alkoxide polymers and substituted alkoxide polymers. To give a desired ceramic composition, these polymers may contain dispersed within them compounds such as carbonates, nitrates, amines, carboxylic acids, substituted carboxylic acid derivatives and salts thereof. Other ceramic precursor polymers include calcium, strontium, barium or other metal complexes with polyorganosiloxanes.

The possible compositions of glasses, and the kinds of polymer that yield glasses upon pyrolysis at the appropriate temperatures, are well known in the art. Those that are capable of being spun to a self-supporting composite polymeric fibre may be used in the invention.

Glasses are particularly suitable as either the core or the sheath of a composite core-sheath ceramic fibre.

An important class of pre-ceramic polymers comprises co-ordination polymers, containing a co-ordination compound or metal complex in their repeating units. Among these polymers are those formed by substituted metallocenes, eg vinyl derivatives. These include pi-complexes of transition metals with three- to eight-membered ring structures, most notably cyclopentadienes.

Some polymers of metallocenes and other co-ordination compounds may not show high strength in the fibre spinning phase but their physical properties may be improved by forming random, block or graft copolymers of two or more monomer species with other similar or dissimilar compounds such as metallosiloxanes, organocyclometallosiloxanes, polysilanes, silamides, polycarbosilanes including cyclopentadienyl silicon compounds, polycarbosilazanes, polysilazanes, silazoxanes, polysiloxanes, cyclosiloxanes, polycarbosiloxanes, silylcarbosiloxanes, carboranes, metallocarboranes, carborane-organopolymers, carboranylsiloxanes, and others.

Another important class includes alkoxide polymers, where a metal atom is bound through oxygen to an alkyl group in an organic polymer such as a polyamide, polyester, polyurethane or polyether.

Other pre-ceramic polymers can be formed by the reaction of a variety of organo-metallic Lewis acids with difunctional organic Lewis bases such as diols, diamines and the like.

Further examples include vinyl organo-metallic structures such as vinyl groups attached to cyclopentadienyl rings, dienes, phenyl rings, and ether or ester functions, in which the metal is bound to these functions. Fibre-forming homopolymers or, more usually, copolymers of two or more of such compounds can be used.

Still further polymeric species include those having metal-oxygen-carbon backbone sequences in their repeating units. Many other suitable pre-ceramic polymers will be apparent to those skilled in the art.

Additives may be incorporated before pyrolysis. The product may benefit in various ways. Refractory, ceramic (including oxides) and metal additives may in particular improve the stoichiometry of the ceramic products of pyrolysis and can be added in amounts which do not affect the spinning process or fibre strength excessively.

One possible additive is ground or powdered ceramics, already pyrolysed.

These may be similar or dissimilar to the ceramic materials to be produced by the invention, and may be incorporated by mixing with the unpyrolysed polymer, or by surface coating it, in an amount up to 80% of the total weight, for example. Typical additives of this kind are silicon nitride, carbide or hexaboride; and carbides, nitrides, carbonitrides, carboborides, diborides, silicides and carbosilicides of transition metals, whether refractory or not.

Another possible additive is the ceramic oxide of a metal in the pre-ceramic polymer, in a controlled amount. The purpose is to use the oxide to remove excess carbon, to allow a closer approach to achieving stoichiometric target materials. Excess carbon in the ceramic product can reduce oxidation resistance. For example, the addition of powdered titanium oxide to an organotitanium ceramic precursor polymer would provide both titanium to form titanium carbide with some excess carbon from the polymer and oxygen to remove further carbon.

A third category of additive is finely divided metals, silicon or boron. Up to 80% by weight will give rise to cermets upon pyrolysis. These can be chosen from similar materials to augment current properties, or from dissimilar materials in order to introduce new properties, such as compatibility with the matrix, hardness, stoichiometry and so on.

The fibres will normally be processed in the stages prior to pyrolysis by conventional means, as far as is allowed by their composition. For example, if the polymer properties allow, the spun fibres will be drawn to stretch them, so as to orient the polymer chains and develop tensile strength. The degree of drawing and stretching will be selected to optimise the physical properties of the fibre before, during and after pyrolysis, as may be required in each case.

The fibres may be spun at initial diameters of, typically, 50 to 200 microns, although depending on the actual fibre shape and the polymer properties, initial thicknesses in the range 10 to 500 microns are possible. Drawing and stretching would reduce this, typically to about 35 microns. Upon pyrolysis, a further loss of diameter may take place.

The final diameter is chosen to match the requirements for the intended end use, by selecting the spinneret size and by controlling the degree of drawing and stretching.

It may be advantageous to give the spun fibre a pre-treatment in air, as is known in the production of carbon fibres from organic polymers. In some circumstances, a preliminary surface oxidation at about 160° to 300° C. can be beneficial. A preliminary heat treatment at about 300° to 700° C. in a controlled atmosphere may be used when the spun fibre is to be stored before pyrolysis, to prevent it degrading (such as by hydrolysis in damp air) or reverting to a plastic mass during storage.

The production of short fibres entails cutting or chopping long fibres (filaments). Often, this may be done after pyrolysis. However, this might result in a reactive core of a core-sheath composite fibre being exposed at the cut fibre ends. The consequence might be reaction of the core with atmospheric oxygen, or with a matrix that is reinforced by the fibre, resulting in degradation of the fibre and/or the matrix. To avoid this, the fibre can be chopped before pyrolysis by pressing together the opposite sides of the sheath in such a way that the continuous core polymer is interrupted, and the sheath polymer is closed and sealed over the parted core polymer ends, before the sheath polymer is cut to separate the individual short fibres.

The pyrolysis step is suitably performed by passing the spun pre-ceramic fibre to a controlled atmosphere furnace, and pyrolysing the fibre in the furnace.

Pyrolysis temperatures will depend on the components of the fibres. Possible extremes are from 150° to 3000° C., more narrowly a minimum of 600° C. and a maximum of 2000° C., depending on the materials and their proportions. The duration of the process may also be adapted to the materials being used.

Pyrolysis may be carried out in a controlled atmosphere, including pressures above or below atmospheric, down to near vacuum. A reducing atmosphere may typically be provided by carbon monoxide, carbon dioxide, hydrogen, ammonia, or suitable mixtures. A carburising atmosphere may typically be provided by methane, ethane, acetylene, or suitable mixtures. A nitriding atmosphere may typically be provided by ammonia, nitrogen or hydrogen/ammonia mixtures. An inert gas atmosphere may be provided by argon or helium, for example. Different atmospheres may be used in consecutive processing cycles, for example by using ammonia or an inert gas in a first sintering stage and then oxygen or air in a subsequent oxidising step to remove excess carbon or to give an oxide product.

After the pyrolysis step, or integrated therewith, known techniques of ceramic modification can be applied, by subjecting the fibre at elevated temperatures (above 500° C., usually about 1000° to 1200° C.) to materials in vapour form. Suitable reactive species may include organometallic compounds, metal and non-metal halides (for example $TiCl_4$, $SiCl_4$ or $BCl_3$) and the like in suitable carrier gases. In general, the techniques known as chemical vapour deposition may be applied as a separate step, or preferably integrated with the pyrolysis by being combined with it or following immediately thereafter.

After pyrolysis the product may be annealed at a lower temperature to heal micro defects in its structure and to improve the surface finish. A suitable gas atmosphere may be used at this stage, for example ammonia to remove excess carbon.

Figure 2:
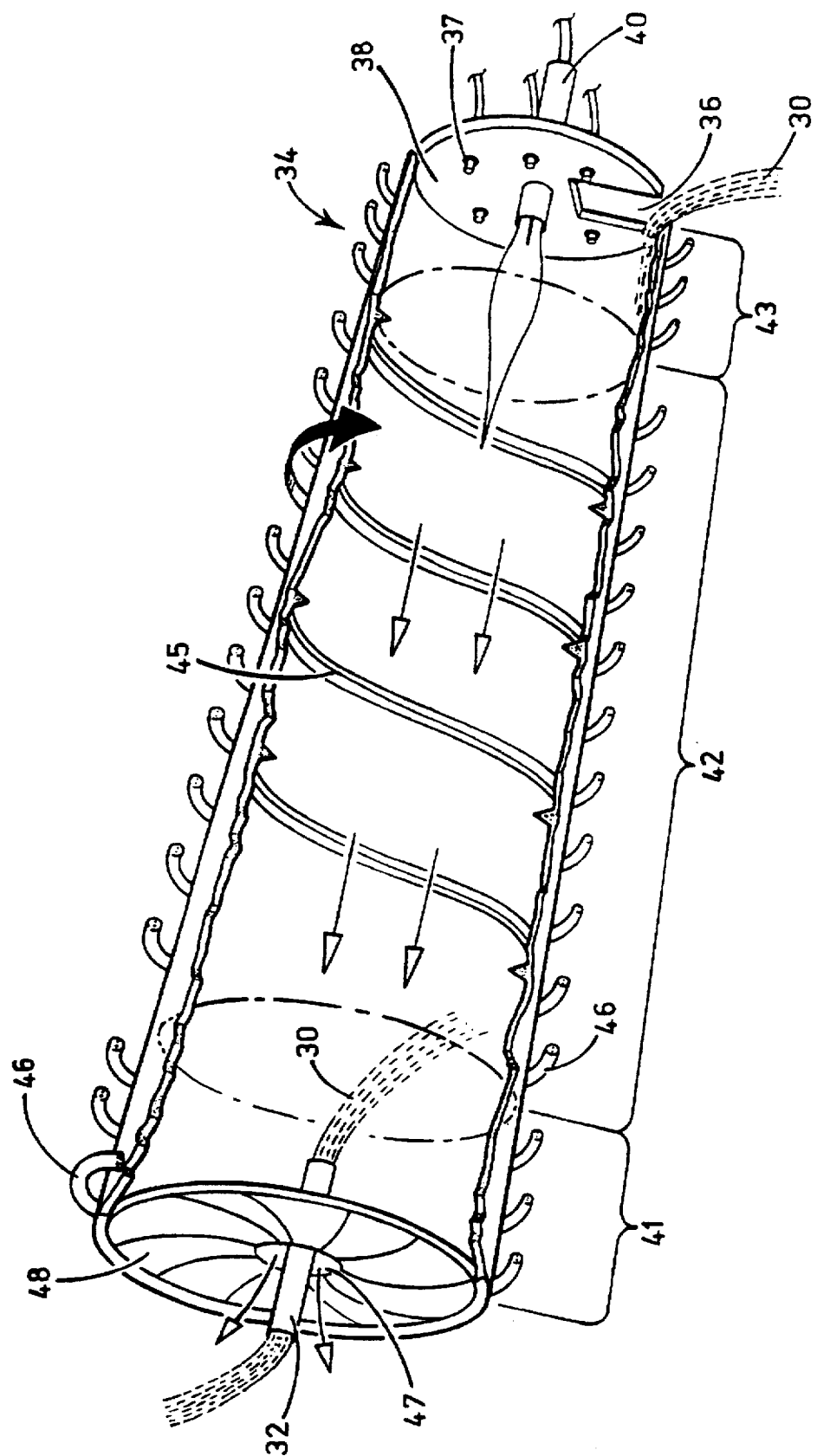

The accompanying drawings illustrate diagrammatically two examples of general types of furnace suitable for carrying out the pyrolysis process. In the drawings:

FIG. 1 is a sectional view of a furnace for pyrolysing a fibre as a continuous filament and FIG. 2 is a sectional view of a furnace for pyrolysing chopped fibres.

In FIG. 1, a composite fibre 10 formed by the conjugate spinning of dissimilar pre-ceramic polymers is pyrolysed in a furnace 14 which has walls of stainless steel, aluminum oxide, graphite or the like. The fibre passes through thread guide 12 and through the central aperture 27 of an iris end wall closure 28 into the first chamber 21 of the furnace, where a pre-heater brings the fibre up to temperature. The fibre is then fed into a continuous helical groove 16 on a rotating refractory cylindrical former 18, of a material compatible with the composition of the fibre, in a central chamber 22 of the furnace, which is maintained at pyrolysis temperature by molybdenum wire heating coils 26. Alternatively, heating could be by resistance heating of the furnace, if it were of suitable material, such as graphite; or by radio frequency induction heating. Finally the pyrolysed ceramic fibre product is unwound from the former in an after-cooler chamber 23 before exiting the furnace through a further iris diaphragm 28.

The furnace atmosphere is provided by counter-current gas flow. The fibre's passage along the helical groove 16 much increases the effective length of the furnace, and hence the treatment time for a given fibre speed.

In FIG. 2, short fibre lengths 30 are introduced into the upper end of an inclined rotary furnace 34 by means of a chute 32 through the central aperture 47 of an iris end wall closure 48. The fibres are tumbled through the furnace, aided by helical ridges 45 which improve fibre distribution and reduce agglomeration in the furnace. The lower end of the furnace is closed by non-rotating end wall 38, which has an exit slot 36, through which pyrolysed ceramic fibres 30 are continuously removed, and gas atmosphere injectors 37.

The gas and fibres pass counter-current through the furnace, which may be divided into a fibre pre-heater zone 41 at the upper end, where the gases lose heat to incoming fibres before exiting the furnace through aperture 47 around the fibre feed chute 32; a central pyrolysis zone 42; and a fibre after-cooler zone 43 at the lower end. Also at this end, incoming gas is pre-heated by a gas plasma gun 40 mounted on the end wall 38.

Heating coils 46 are provided outside the cylindrical furnace wall.

The following are examples of some of the various classes of starting polymer and kinds of conjugate spun pre-ceramic fibre that may be pyrolysed to ceramic fibres in accordance with this invention, provided that suitable combinations of specific starting materials and process conditions are selected.

1. A copolymer of a silicon ester with either a metallosiloxane or a polycarbosilane as a core, and a polymerised carboranyl-organic monomer or an ester of boronic acid as a sheath, is conjugate spun by melt or dry spinning. The pre-ceramic fibre is then pyrolysed in an inert or carburising atmosphere to yield a silicon carbide ceramic fibre.

2. A polymeric aluminum isopropoxide core with a sheath of a poly(N-alkylimino alane) is spun by a melt or dry spinning process. The pre-ceramic fibre is pyrolysed in ammonia or a nitriding atmosphere to form a composite ceramic fibre having an aluminium nitride sheath enclosing an aluminium oxide core.

3. A titaniumalkyl or aryl carborane sheath is conjugate spun over a polymerised titanocene core. Pyrolysis in a carburising or inert atmosphere gives a titanium carbide core with a titanium carboboride or boride sheath.

4. A silane copolymer is spun as a core in a carboranyl titanoester sheath. Pyrolysis in an inert argon atmosphere or a methane carburising atmosphere gives a composite ceramic fibre having a titanium carboboride or boride sheath over a silicon carbide core.

5. A pre-ceramic fibre comprising a conjugate spun silicon polymer core in a polymeric titanium alkylamine sheath is pyrolysed in an ammonia atmosphere to give a silicon carbide core in a titanium carbonitride sheath.

6. A pre-ceramic fibre comprising a conjugate spun carboranyl titanoester core in a metallosiloxane and silicon ester/polycarbosilane copolymer sheath is pyrolysed to give a titanium carbide core in a silicon carbide sheath.

7. A polymeric silicon ester (polytetrakistriarylsiloxysilane) is conjugate spun as a core to a carborane polyester sheath, to yield a silicon carbide/boron carbide ceramic fibre upon pyrolysis.

8. A copolymer of a silicon ester with a carbosilane is conjugate spun with a sheath of poly(alkylimino alane) to yield a silicon carbide/aluminium nitride ceramic fibre upon pyrolysis.

9. A polycarbosilazane is conjugate spun with a poly (alkylimino alane) to yield a silicon nitride/aluminium nitride upon pyrolysis.

10. A polycarbosilazane core is conjugate spun with a polytitanoxamine sheath giving a mixed silicon nitride/ titanium nitride/titanium carbonitride/titanium oxynitride product upon pyrolysis.

11. A silicon ester copolymerised with a carbosilane co-extruded with polytitanoxamine gives a silicon carbide/ titanium carbonitride fibre upon pyrolysis.

12. A poly(alkylimino alane) core with a polysiliconester sheath gives an aluminium nitride/silicon carbide fibre upon pyrolysis.

13. A polymeric silicon ester conjugate spun as a core with a first sheath of aluminium isopropoxamine and an outer sheath of a second poly(silicon ester) gives a three layer silicon carbide/aluminium oxynitride/silicon carbide composite ceramic fibre upon pyrolysis.

14. A silicon polymer conjugate spun as a core with a borazine polymer as a first sheath and a poly(silicon ester) as an outer sheath gives a three component silicon carbide/ boron nitride/silicon carbide ceramic fibre upon pyrolysis.

15. Single copper, yttrium or barium alkoxides or double copper-barium, copper-yttrium or yttrium-barium alkyl or aryl alkoxides are polymerised by known methods. Emulsions of copper/barium oxide or other copper compounds may be added to achieve the desired proportions of elements. The polymer is wet spun as a sheath around a core alkoxide polymer formed from aluminium isopropoxide and tetraethoxysilane by known techniques and pyrolised in an oxidising atmosphere, whereby to form a sheath containing elements occurring in known superconductors around a core of alumino-silicate (mullite).

16. A complex sol-gel polymer sheath prepared by copolymerising calcium glycerosilicate with a double alkoxide polymer of aluminium isopropoxide and tetraethoxysilane and a double alkoxide polymer of tetraethoxysilane and butyl borate under gentle reflux in ether and then dry jet wet spinning into a bath of aqueous acidified alcohol around a complex polysilane core. The composite polymeric preceramic fibre that is formed is then pyrolysed in an inert atmosphere (nitrogen or argon) to give a glassy composite ceramic fibre with a silicon carbide core.

Oxynitride glasses can be obtained by modifying the alkoxide mixtures with suitable metalloalkoxyamine compounds. Metallosiloxanes may be added as polymers or emulsions to improve the glass forming properties of the sheath. Ethanolamine alkoxides may also be used to give oxynitride glasses upon pyrolysis in an ammonia atmosphere.

17. A core of the same polymer as used for the sheath in Example 16 is co-extruded by dry jet wet spinning in a polyacrylonitrile sheath into a bath of aqueous acidified alcohol. The sheath is oxidised in a conventional manner before pyrolysis in a nitrogen atmosphere to give a ceramic fibre with a carbon outer sheath over a complex glass core.

Three-layer core-sheath fibres provide reinforcement materials with an internal crack propagation barrier. The intermediate layer provides a soft phase between the core reinforcement fibre and the outer sheath compatible with the matrix, resisting crack propagation and debonding of the ceramic/matrix composite and also providing an intermediate layer between materials of low and high coefficients of expansion.

In summary, the invention provides for the preparation of pre-ceramic fibres by the conjugate spinning of dissimilar fibre-forming polymeric ceramic precursors, utilising techniques developed in the textile industry, and permitting control of end product chemistry by selection and synthesis of desired polymeric starting materials; the optional inclusion of additives to further modify the products and control at the pyrolysis stage to develop yet further the final composition and properties of the fired ceramic fibre end product, to adapt it to its intended use, typically as a matrix reinforcement material.

In contradistinction to the teaching of my aforesaid international patent application, this invention now extends to methods in which no separate organo-metallic ceramic precursor is dispersed in any organic polymer making up the conjugate spun pre-ceramic fibre.

The invention is not concerned with the preparation of novel polymers as such. The classes of pre-ceramic polymer mentioned herein are either well known, with methods of preparation that are to be found in the literature, or may be prepared by techniques that are analogous to others that are known and used in conventional polymer chemistry. The invention is essentially concerned with methods of utilising such polymeric ceramic precursors as may from time to time be available and suitable to form composite ceramic fibres by conjugate spinning and pyrolysis.

I claim:

1. A method for making a composite ceramic fibre which comprises:

conjugate spinning continuous lengths of a plurality of different fiber forming pre-ceramic polymers to form a self-supporting composite pre-ceramic polymeric fiber having at least two pre-ceramic polymeric components which each extend continuously along the length of said pre-ceramic fiber;

pyrolyzing said composite pre-ceramic fiber thereby converting said composite pre-ceramic fiber into a composite ceramic fiber having at least two ceramic components which each extend continuously along the length of said ceramic fiber;

said fiber forming pre-ceramic polymers including repeating units containing a ceramic-forming element other than carbon and oxygen.

2. A method according to claim 1 wherein the conjugate spinning is carried out to form a composite bilateral or core-sheath fibre structure.

3. A method according to claim 2 wherein the conjugate spinning is carried out to form a core, an intermediate sheath and an outer sheath.

4. A method according to claim 2 wherein a first polymeric ceramic precursor is co-extruded around a central core of a second polymeric ceramic precursor, and the second polymer is from 5 to 85% of the whole, by weight, at the point of extrusion.

5. A method according to claim 1 wherein the conjugate spinning is carried out by a method selected from the group consisting of wet spinning, dry spinning, melt spinning, dispersion spinning, emulsion spinning, and reaction spinning.

6. A method according to claim 1 wherein the dissimilar pre-ceramic polymers are immiscible.

7. A method according to claim 1 wherein the proportion of each pre-ceramic polymer is at least 5% by weight of the whole fibre before pyrolysis.

8. A method according to claim 1 wherein the pre-ceramic polymer is selected from the group consisting of organometallic and inorganic fibre-forming polymers, being polymeric compounds of ceramic-forming elements.

9. A method according to claim 1 wherein at least one of the pre-ceramic polymers is a pre-ceramic organic polymer.

10. A method according to claim 1 wherein at least one of the pre-ceramic polymers contains metal atoms in its repeating groups.

11. A method according to claim 10 wherein the metal is at least one selected from the group consisting of titanium, vanadium, chromium, manganese, iron, cobalt, nickel, aluminium, gallium, yttrium, zirconium, niobium, molybdenum, ruthenium, rhodium, palladium, lanthanum, hafnium, tantalum, tungsten, rhenium, osmium, iridium, platinum and the lanthanoids.

12. A method according to claim 1 wherein at least one of the pre-ceramic polymers includes non-metals or metalloids selected from the group consisting of carbon, boron, silicon, nitrogen, oxygen, phosphorus, sulfur, germanium, and arsenic.

13. A method according to claim 1 wherein the composite polymeric fibre comprises a pre-ceramic polymer that is without metals and includes silicon or boron.

14. A method according to claim 1 wherein the composite polymeric fibre comprises a pre-ceramic polymer that forms a glass upon pyrolysis.

15. A method according to claim 14 wherein the glass is an aluminosilicate.

16. A method according to claim 1 wherein the composite polymeric fibre comprises a pre-ceramic alkoxide polymer.

17. A method according to claim 1 wherein the composite polymeric fibre comprises a pre-ceramic polyorganosiloxane.

18. A method according to claim 1 wherein the composite polymeric fibre comprises a pre-ceramic co-ordination polymer containing a co-ordination compound or metal complex in its repeating unit.

19. A method according to claim 18 wherein the said co-ordination polymer comprises a substituted metallocene.

20. A method according to claim 19 wherein the metallocene is a transition metal: cyclopentadiene pi-complex.

21. A method according to claim 18 wherein the said co-ordination polymer comprises a polymer of an organometallic co-ordination compound copolymerised with other species.

22. A method according to claim 1 wherein the composite polymeric fibre comprises a pre-ceramic organo-metallic vinyl polymer.

23. A method according to claim 22 wherein the vinyl polymer is a fibre-forming copolymer of two or more organo-metallic vinyl monomers.

24. A method according to claim 1 wherein the composite polymers fibre includes a refractory, ceramic, pre-ceramic and/or metal additive to modify the stoichiometry of the ceramic product upon pyrolysis.

25. A method according to claim 24 wherein the ceramic additive is incorporated by mixing with unpyrolysed polymer, or by surface coating it, in an amount up to 80% of the total weight.

26. A method according to claim 24 wherein the additive is selected from the group consisting of silicon nitride, silicon carbide and silicon hexaboride, and carbides, nitrides, carbonitrides, carboborides, diborides, silicides and carbosilicides of transition metals.

27. A method according to claim 24 wherein the additive is the ceramic oxide of a metal in the pre-ceramic polymer.

28. A method according to claim 24 wherein the additive comprises up to 80% by weight of a finely divided metal, silicon or boron.

29. A method according to claim 1 wherein the spun fibre is drawn whereby to orient the polymer chains and develop tensile strength before pyrolysis.

30. A method according to claim 1 wherein the fibre is spun at an initial diameter of 50 to 200 microns.

31. A method according to claim 1 wherein the spun fibre is given a preliminary surface oxidation before pyrolysis.

32. A method according to claim 1 wherein the spun fibre is given a preliminary heat treatment at about 300° to 700° C. in a controlled atmosphere prior to storage before pyrolysis.

33. A method according to claim 1 wherein the pyrolysis temperature is from 600° C. to 2000° C.

34. A method according to claim 1 wherein the pyrolysis step is performed by passing the spun pre-ceramic fibre to and through a controlled atmosphere furnace, and pyrolysing the fibre in the furnace.

35. A method according to claim 34 wherein the controlled atmosphere is provided by a gas which passes counter-current to the fibre or fibres through the furnace, and the furnace is divided into a fibre pre-heater zone, a pyrolysis zone, and a fibre after-cooler zone.

36. A method according to claim 34 wherein the controlled atmosphere is a reducing atmosphere provided by carbon monoxide, carbon dioxide, hydrogen, ammonia, or mixtures thereof.

37. A method according to claim 34 wherein the controlled atmosphere is a carburising atmosphere provided by methane, ethane, acetylene, or mixtures thereof.

38. A method according to claim 34 wherein the controlled atmosphere is a nitriding atmosphere provided by ammonia, nitrogen or hydrogen/ammonia mixtures.

39. A method according to claim 34 wherein chopped short fibres are pyrolysed during tumbling through a rotary cylindrical furnace.

40. A method according to claim 1 wherein the pyrolysed ceramic fibre is modified after pyrolysis by subjecting the fibre at elevated temperatures to a reactive material in vapour form.

41. A method according to claim 40 wherein the reactive material is selected from the group consisting of organometallic compounds, and metal and non-metal halides, in a carrier gas.

42. A method according to claim 1 wherein the ceramic fibre is subjected to chemical vapour deposition as a separate step or integrated with the pyrolysis.

43. A method according to claim 1 wherein the product of pyrolysis is thereafter annealed at a lower temperature.

44. The method of claim 1 wherein said fiber forming pre-ceramic polymers are spun without a separate organic polymer carrier or separate organometallic ceramic precursor being present in any of the components.

45. A method of making a composite ceramic fibre comprising forming a self-supporting composite polymeric fibre by the conjugate spinning of at least two dissimilar pre-ceramic polymers to form a composite core-sheath fibre having a continuous core and a surrounding sheath respectively formed from said dissimilar polymers, wherein each of said polymers includes repeating units containing a ceramic-forming element other than carbon and oxygen, and thereafter pyrolysing the spun fibre to form a composite ceramic fibre having regions with dissimilar ceramic compositions derived from the respective dissimilar polymers, and wherein said spun core-sheath fibre is chopped before pyrolysis by pressing together the opposite sides of the sheath in such a way that the continuous core polymer is interrupted, and the sheath polymer is closed and sealed over the parted core polymer ends, before the sheath polymer is cut to separate the individual short fibres.

46. A method of making a composite ceramic fibre comprising forming a self-supporting composite polymeric fibre by the conjugate spinning of at least two dissimilar pre-ceramic polymers, wherein each of said polymers includes repeating units containing a ceramic-forming element other than carbon and oxygen, and thereafter pyrolysing the spun fibre to form a composite ceramic fibre having regions with dissimilar ceramic compositions derived from the respective dissimilar polymers, and wherein the pyrolysis step is performed by passing the spun pre-ceramic fibre to a controlled atmosphere furnace, and pyrolysing the fibre in the furnace, and wherein the spun fibre is pyrolysed in a continuous helical groove on a rotating refractory cylinder.

* * * * *